Dec. 4, 1934.   T. V. BUCKWALTER   1,982,899
ROLLER BEARING AND CAGE
Filed June 21, 1933
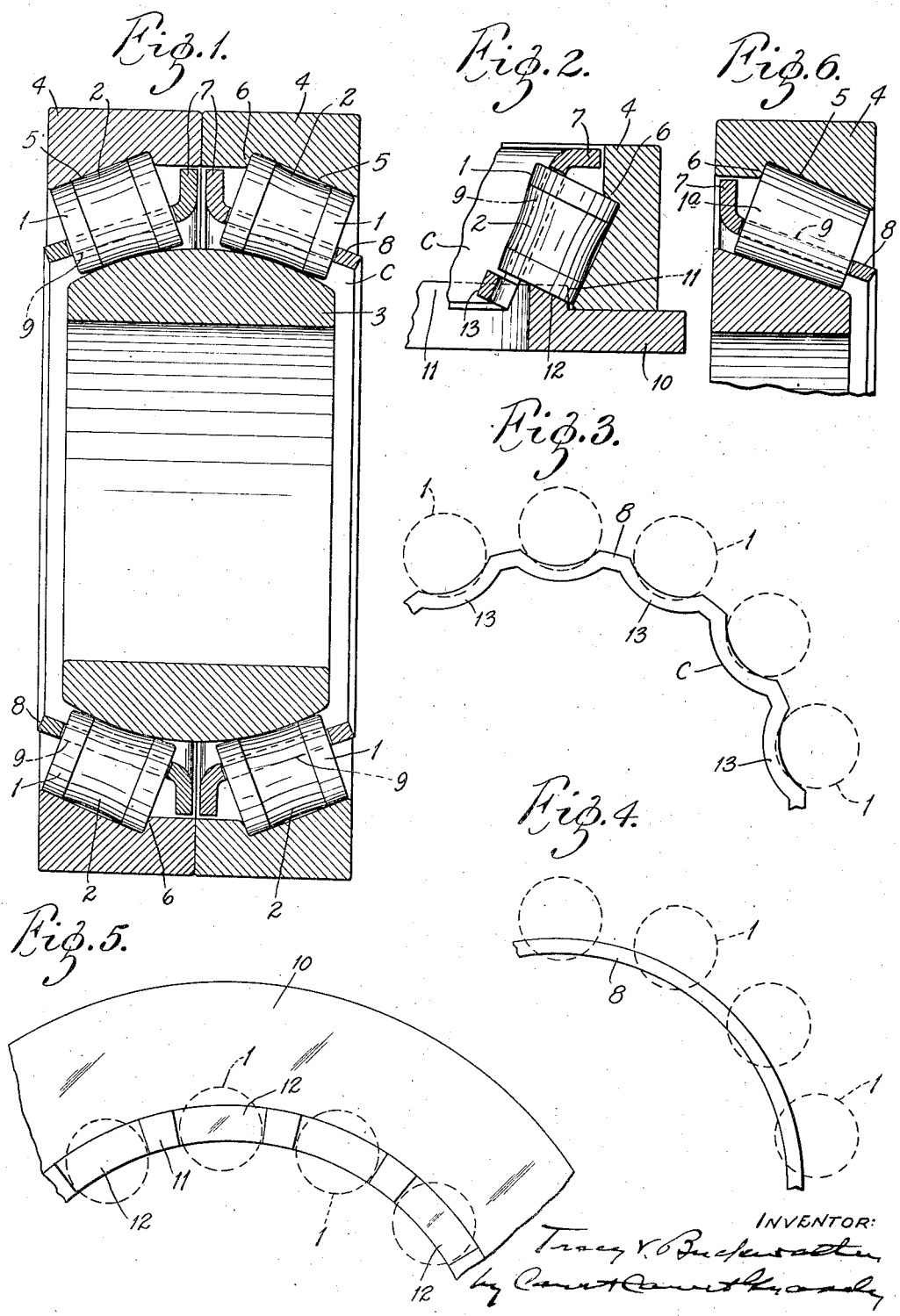
INVENTOR:
Tracy V. Buckwalter
by Carrett Carrett & Kready
HIS ATTORNEYS.

UNITED STATES PATENT OFFICE 1,982,899

ROLLER BEARING AND CAGE

Tracy V. Buckwalter, Canton, Ohio, assignor to The Timken Roller Bearing Company, Canton, Ohio, a corporation of Ohio Application June 21, 1933, Serial No. 676,771

6 Claims. (Cl. 308—214)

This application relates to a roller bearing assembly suitable for assembling according to the process of my Patent No. 1,846,836 granted February 23, 1932. A principal object of the invention is a cage that assists in maintaining lubricant at the large ends of the rollers, that does not churn up the oil in the bearing enclosure and that may be snapped over the rollers after they have been temporarily positioned, without risk of injuring said rollers. A further principal object is a bearing in which the thrust rib is on the outer member and which provides proper lubrication for said thrust rib.

The invention further consists in the bearing and cage, and in the parts and combinations and arrangements of parts hereinafter described and claimed.

In the accompanying drawing,

Fig. 1 is a longitudinal sectional view of a double row assembled bearing embodying my invention, Fig. 2 is a part sectional view of the bearing cup, rollers and cage, showing the annular assembling plate that holds the rollers in position before the cage is mounted thereon, Fig. 3 is a fragmentary view of the small end of the cage and rollers, showing the cage before shaping, Fig. 4 is a similar view after the final shaping of the cage, Fig. 5 is a fragmentary plan view of said assembling plate with the positions of rollers indicated in dotted lines; and Fig. 6 is a view of a single row bearing of the plain conical type.

In Fig. 1 is illustrated a bearing of the double row self-alining type in which the rollers 1 are of generally conical form, provided with concave middle portions 2 that engage a convexly curved inner bearing member 3 and in which the cup or outer bearing member 4 has a conical raceway 5 and a thrust rib 6 that engages the large ends of the rollers 1.

The cage C is of generally conical form and is arranged radially inward of the circle passing through the axes of the rollers, so as to make the rollers 1 and the bearing cup 4 a self-contained unit. The large end of the cage has an outturned annular flange 7 that fits closely in the cylindrical space formed by the thrust rib 6. The small end of the cage is an annular end ring 8. Bridges 9 form the body of the cage and space the rollers apart.

In the preferred process of mounting the rollers 1 in the cup 4, as shown in Fig. 2, an assembling plate 10 is disposed at the end of the bearing cup 4 and has an annular flange 11 projecting into the bore of the cup. Said flange 11 has beveled seats 12 in its face, said seats being spaced and located so as to give the rollers 1 the positions in the cup that they are to have in the assembled bearing. The small end ring of the cage is crimped inwardly, as indicated at 13, to provide a depression or corrugation corresponding to each roller; and the cage is then inserted into the assembled series of rollers, said crimped ends 13 snapping over the small ends of the rollers. The end ring 8 is then restored by any suitable mechanism to circular form.

As illustrated in Fig. 6, the cage is equally adaptable for use with rollers 1a of true conical form.

The above described construction has numerous advantages. The large end ring of the cage, fitting closely in the circle of the thrust rib, maintains lubricant at the large ends of the rollers and on the thrust rib; and it also relieves the rollers from the load of the cage after wear takes place. Churning up of the lubricant is reduced to a minimum by reason of the large end of the cage not dipping into the lubricant and the small end thereof being of circular form, free from projecting or corrugated portions.

What I claim is:

1. A roller bearing comprising an outer bearing member having a conical raceway and a thrust rib, rollers of generally conical form mounted in said bearing member with their large ends abutting against said thrust rib and a cage for the rollers having an outwardly projecting annular flange extending across the large ends of the rollers and fitting snugly in the circular bore formed by said thrust rib and having a circular ring extending across the small ends of the rollers, said cage being disposed radially inward of a circle passing through the axes of said rollers, so that said rollers and cage form a self-contained unit.

2. A roller bearing comprising an outer bearing member having a conical raceway and a thrust rib, rollers of generally conical form mounted in said bearing member with their large ends abutting against said thrust rib and a conical cage for the rollers having an outwardly projecting annular flange at its large end fitting snugly in the circular bore formed by said thrust rib and having a circular ring at its small end, said cage being disposed radially inward of a circle passing through the axes of said rollers, so that said rollers and cage form a self-contained unit.

3. A cage for conical roller bearings comprising a plurality of spacer bridges adapted to space the rollers, an outwardly extending annular flange at its large end and a ring at its small end provided with an outward corrugation for each roller, whereby said cage may be snapped over said rollers.

4. A roller bearing comprising an outer bearing member having a conical raceway and an integral thrust rib, rollers each having conical end portions engaging said conical raceway and a conical middle portion mounted in said bearing member with their large ends abutting against said thrust rib, a convexly curved inner bearing member engaging the concave middle portions of said rollers and a conical cage for the rollers having an outwardly projecting annular flange at its large end fitting snugly in the circular bore formed by said thrust rib and having a circular ring at its small end.

5. A roller bearing comprising an outer bearing member having a conical raceway and an integral thrust rib, rollers each having conical end portions engaging said conical raceway and a conical middle portion mounted in said bearing member with their large ends abutting against said thrust rib, a convexly curved inner bearing member engaging the concave middle portions of said rollers and a conical cage for the rollers having an outwardly projecting annular flange at its large end fitting snugly in the circular bore formed by said thrust rib and having a circular ring at its small end, said cage being disposed radially inward of a circle passing through the axes of said rollers, so that said rollers and cage form a self-contained unit.

6. A roller bearing comprising outer bearing members disposed end to end and each having an integral thrust rib at its inner end and a conical raceway tapering away from said thrust rib, a spherical inner bearing member, a circular series of rollers for each of said raceways, said rollers each having conical end portions engaging one of said raceways and a concave middle portion engaging said spherical inner bearing member and a cage for each series of rollers, each cage having an outwardly extending annular flange extending across the large ends of the rollers and fitting snugly in the circular bore formed by a thrust rib and having a ring extending across the small ends of said rollers, said cage being disposed radially inward of a circle passing through the axes of said rollers, so that said rollers and cage form a self-contained unit.

TRACY V. BUCKWALTER.